United States Patent

Tokutake et al.

[11] Patent Number: 5,228,727
[45] Date of Patent: Jul. 20, 1993

[54] TUBULAR BODY HAVING PIPE JOINT MEMBER ATTACHED THERETO AND METHOD OF PRODUCING SAME

[75] Inventors: Toshinori Tokutake; Hirosaburo Hirano, both of Tochigi, Japan

[73] Assignee: Showa Aluminum Corporation, Osaka, Japan

[21] Appl. No.: 864,195

[22] Filed: Apr. 3, 1992

Related U.S. Application Data

[63] Continuation of Ser. No. 635,027, Dec. 28, 1990, abandoned.

[30] Foreign Application Priority Data

Dec. 28, 1989 [JP] Japan ............................ 1-152989[U]

[51] Int. Cl.⁵ ............................................ F16L 41/08
[52] U.S. Cl. .................................... 285/189; 165/178; 228/189
[58] Field of Search ................ 62/225; 165/153, 173, 165/178; 285/189

[56] References Cited

U.S. PATENT DOCUMENTS

| | | | |
|---|---|---|---|
| 2,495,615 | 1/1950 | VanderClute | 285/189 X |
| 2,566,502 | 9/1951 | Smith | 285/189 X |
| 3,481,310 | 12/1969 | Alburger | 285/189 X |
| 3,742,722 | 7/1973 | Leimbach | 62/225 |
| 4,103,940 | 8/1978 | Bills | 285/189 |
| 4,945,635 | 8/1990 | Nobusue et al. | 29/890.043 |

FOREIGN PATENT DOCUMENTS 1214135 4/1960 France ........................ 285/189

Primary Examiner—Allen J. Flanigan

[57] ABSTRACT

A tubular body according to the present invention has a pipe joint member attached to the peripheral wall thereof and communicating with the interior of the tubular body. The peripheral wall of the tubular body includes a curved wall portion having a circular-arc cross section and formed with a hole. The joint member has an outward flange at an intermediate portion of its length and a tubular portion positioned beyond the outward flange toward one end of the joint member and has its outer end inserted in the hole in the tubular body curved wall portion. The outward flange of the joint member is brazed to the outer surface of the tubular body curved wall portion with a brazing ring which is fitted around the joint member tubular portion and positioned outside the tubular body. The brazing ring is made of a brazing sheet including cladding of brazing material over each of its opposite surfaces and has one surface joined to the outward flange and the other surface joined to the outer surface of the curved wall portion.

7 Claims, 8 Drawing Sheets

TUBULAR BODY HAVING PIPE JOINT MEMBER ATTACHED THERETO AND METHOD OF PRODUCING SAME

This is a continuation of U.S. application Ser. No. 635,027, filed Dec. 28, 1990, now abandoned.

BACKGROUND OF THE INVENTION

The present invention relates to pipes, headers or like tubular bodies having a pipe joint member, for example, for use in connecting two pipes together in a T-shaped arrangement or in connecting a heat medium feed pipe or discharge pipe to the peripheral wall of the tubular header of a heat exchanger, and a method of producing the same.

The term "aluminum" as used herein includes pure aluminum and aluminum alloys.

For example, when two pipes are to be connected together in a T-shaped arrangement, a pipe joint member having an outward flange at an intermediate portion of its length is attached to the peripheral wall of one of the pipes in communication with the interior thereof, and the other pipe is connected to the pipe with use of the pipe joint member.

Pipes having a pipe joint member attached thereto are already known. The peripheral wall of such a pipe includes a flat portion formed by locally pressing the peripheral wall inward and having a hole. The pipe joint member has an outward flange at an intermediate portion of its length, and a tubular portion positioned beyond the outward flange toward one end of the member and having its outer end inserted in the hole in the peripheral wall of the pipe. The outward flange of the joint member is brazed to the outer surface of the flat portion of the pipe with a brazing ring fitted around the tubular portion of the joint member and positioned outside the pipe. The brazing ring is made of a brazing sheet including a cladding of brazing material over each of its opposite surfaces. To connect the joint member to the pipe, one surface of the ring is joined to the outward flange, and the other surface thereof to the outer surface of the pipe flat portion.

However, the conventional pipe having the pipe joint member attached thereto has the problem that it is cumbersome to form the flat portion on the pipe. Further since the flat portion is formed by locally projecting the peripheral wall of the pipe inward, another problem is encountered in that the flow of fluid through the pipe involves a great pressure loss due to the projected portion.

SUMMARY OF THE INVENTION

The main object of the present invention is to provide a tubular body having a pipe joint member attached thereto free of the above problems.

To fulfill the above object, the present invention provides a tubular body having a pipe joint member attached to the peripheral wall thereof and communicating with the interior of the tubular body, the peripheral wall of the tubular body including a curved wall portion having a circular-arc cross section and formed with a hole, the pipe joint member having an outward flange at an intermediate portion of its length and a tubular portion positioned beyond the outward flange toward one end of the joint member, the tubular portion having its outer end inserted in the hole formed in the curved wall portion of the tubular body, the outward flange of the joint member being brazed to the outer surface of the curved wall portion of the tubular body with a brazing ring fitted around the tubular portion of the joint member and positioned outside the tubular body, the brazing ring being made of a brazing sheet including a cladding of brazing material over each of its opposite surfaces, the brazing ring having one surface joined to the outward flange and the other surface joined to the outer surface of the curved wall portion.

With the assembly of the present invention, the peripheral wall of the tubular body need not be locally formed with the flat portion which is necessary for the conventional assembly. This serves to correspondingly simplify the fabrication process. Moreover, since the peripheral wall of the tubular body has no flat portion, there is no decrease in the internal cross sectional area of the tubular body to eliminate the increase in the pressure loss. Additionally, the pipe joint member can be joined to the tubular body simultaneously with the brazing operation for the fabrication of the heat exchanger or the like in which the assembly is to be included.

Embodiments of the present invention will be described below with reference to the accompanying drawings for illustrative purposes only.

BRIEF DESCRIPTION OF THE DRAWINGS

FIG. 1 is a perspective view showing the evaporator in its entirety;

FIG. 2 is an exploded perspective view of the joint between the heat medium discharge pipe and the equalizer;

FIG. 3 is an enlarged view in section taken along the line III—III in FIG. 2 with the equalizer omitted;

FIG. 4 is a fragmentary perspective view showing the pipe joint member before it is attached to the discharge pipe;

FIG. 5 is an enlarged view in section taken along the line V—V in FIG. 4;

FIG. 6 is a perspective view showing the condenser in its entirety;

FIG. 7 is a fragmentary perspective view showing on an enlarged scale the pipe joint member as attached to the outlet header; and FIGS. 8 to 10 are views showing stepwise a method of producing the outlet header.

DESCRIPTION OF THE PREFERRED EMBODIMENTS

Figure 1:
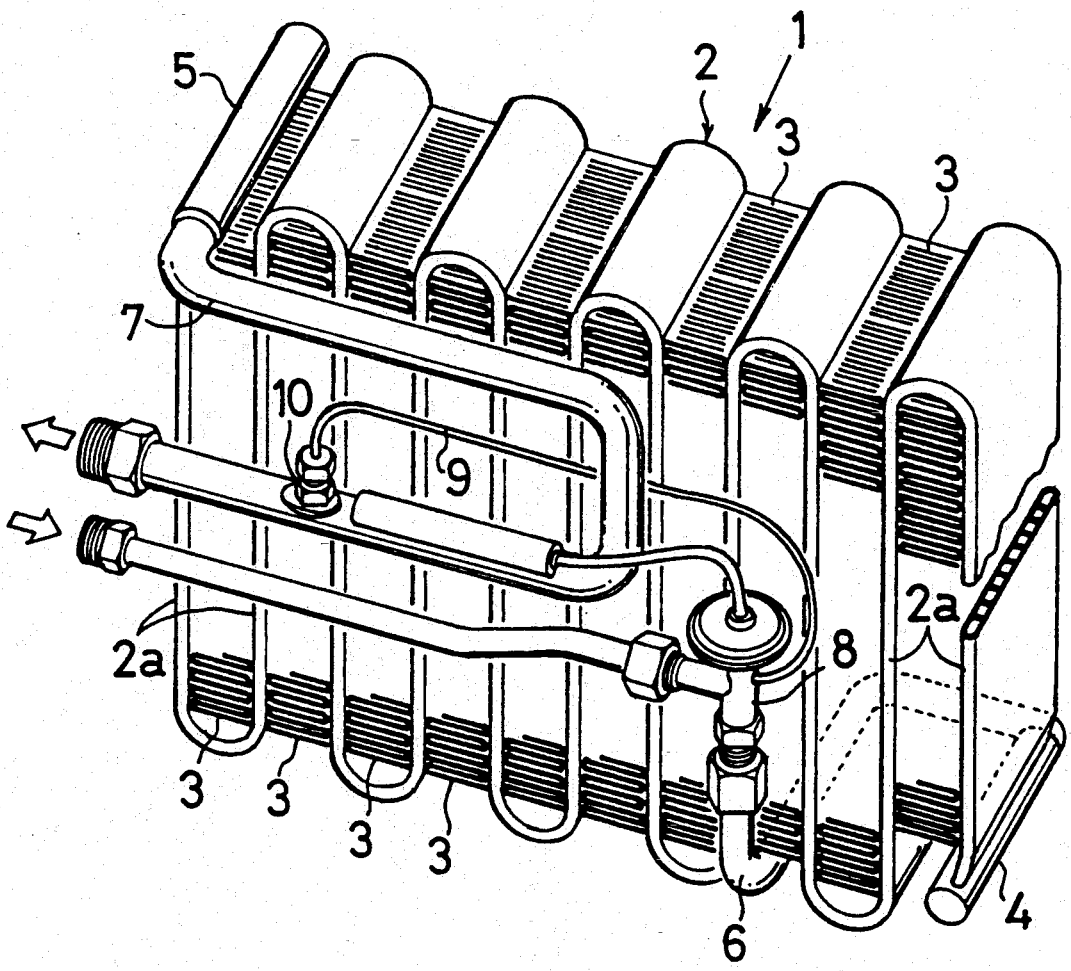
FIGS. 1 to 5 show a tubular body having a pipe joint member as an embodiment of the invention wherein the tubular body is the heat medium discharge pipe of an evaporator for a motor vehicle air conditioner, and the pipe joint member is used for connecting to the discharge pipe an equalizer extending from an expansion valve on the heat medium feed pipe of the evaporator.

Throughout the drawings, like parts are designated by like reference numerals.

FIGS. 1 to 5 show an embodiment of the invention for use in an evaporator for motor vehicle air conditioners for connecting an equalizer extending from an expansion valve on the heat medium feed pipe of the evaporator to the heat medium discharge pipe thereof. With reference to FIG. 1 showing the evaporator 1 in its entirety, the evaporator 1 comprises a zigzag flat tube 2 made, for example, of an aluminum extrudate, corrugated fins 3 made, for example, of aluminum and interposed between the adjacent straight tube portions 2a of the flat tube 2, an inlet header 4 made, for example, of aluminum and having one end of the flat tube 2 connected thereto, an outlet header 5 made, for example, of aluminum and having the other end of the flat tube 2 connected thereto, the heat medium feed pipe 6 made, for example, aluminum and connected to the inlet header 4, and the heat medium discharge pipe 7 made, for example, of aluminum and connected to the outlet header 5. The expansion valve 8 is mounted on an intermediate portion of the feed pipe 6 and has connected thereto the equalizer 9 which is made, for example, of aluminum. The other end of the equalizer 9 is connected by a pipe joint 10 to the peripheral wall of the discharge pipe 7 of the evaporator 1.

Figure 2:
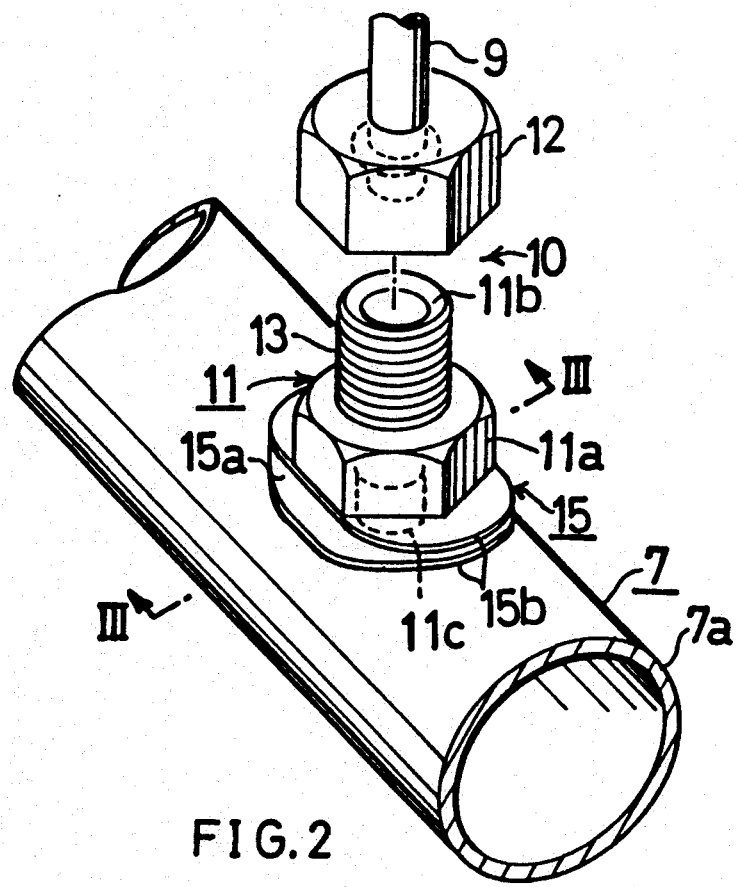
Figure 3:
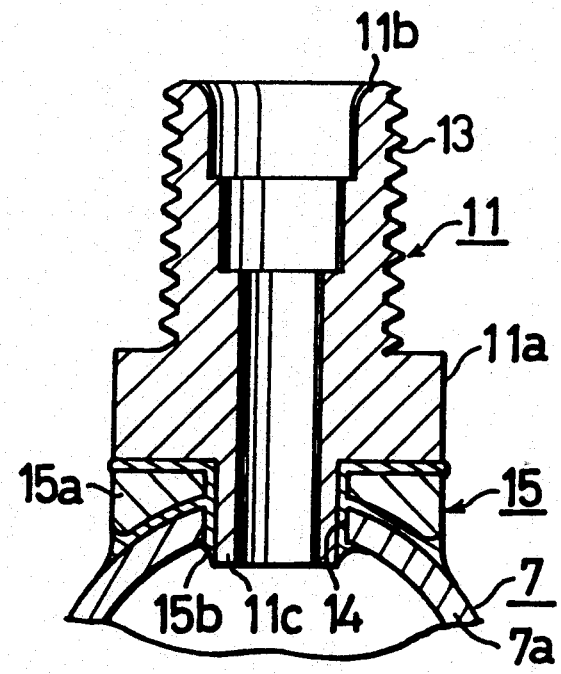

As shown in detail in FIGS. 2 and 3, the pipe joint 10 comprises a pipe joint member 11 made, for example, of aluminum and attached to the peripheral wall 7a of the heat medium discharge pipe 7 in communication with the interior thereof, and a cap nut 12 made, for example, of aluminum and rotatably attached to the above-mentioned other end of the equalizer 9. The joint member 11 attached to the discharge pipe 7 is integrally formed with an outward flange 11a positioned at an intermediate portion of its length and having an outer periphery which is hexagonal in cross section. The joint member 11 has a tubular portion 11b extending upward from the flange 11a and externally threaded to provide a male screw 13, and a tubular portion 11c extending downward from the flange 11a. The tubular portion 11c has its lower end inserted in a hole 14 formed in the peripheral wall 7a of the discharge pipe 7. The joint member 11 is joined to the peripheral wall 7a of the discharge pipe 7 with a brazing ring 15 fitted around the lower tubular portion 11c and positioned outside the discharged pipe 7. Around the tubular portion 11c, a brazing material 15b is provided in the hole 14 and also in the hole of the ring 15. The cap nut 12 rotatably attached to the end of the equalizer 9 is screwed on the male screw 13 of the tubular portion 11b of the joint member 11, whereby the equalizer 9 is connected to the peripheral wall 7a of the discharge pipe 7.

The pipe joint member 11 is secured to the peripheral wall 7a of the heat medium discharge pipe 7 in the following manner.

Figure 4:
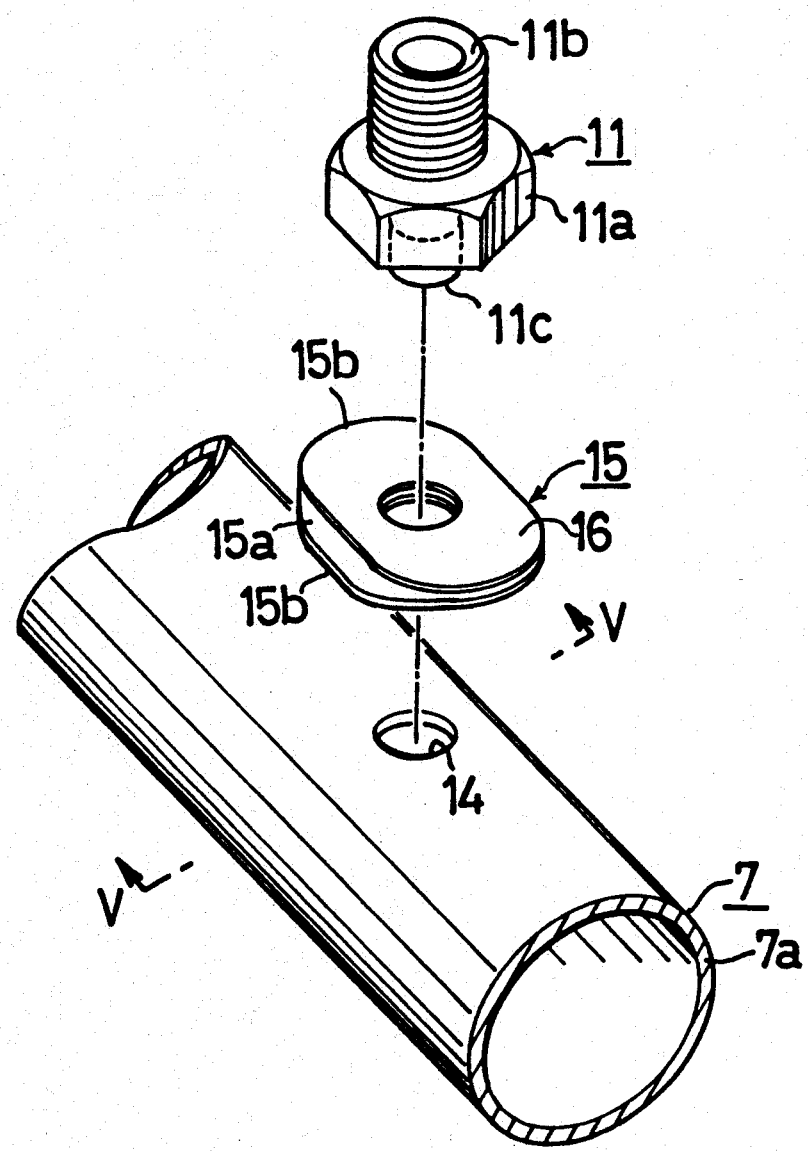
Figure 5:
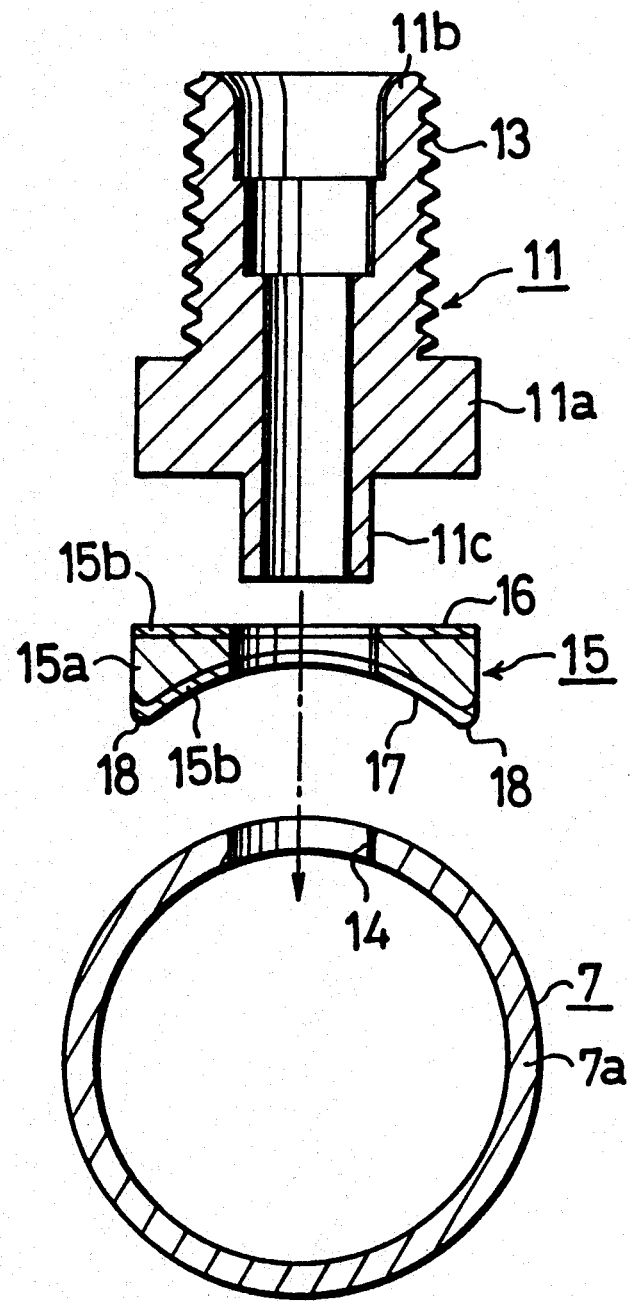

With reference to FIGS. 4 and 5, the brazing ring 15 is fitted around the tubular portion 11c of the joint member 11 extending downward from its outward flange 11a. The brazing ring 15 is prepared, for example, by pressing an aluminum brazing sheet comprising a core 15a and a cladding of brazing material 15b formed over each of opposite surfaces of the core. The upper surface of the ring is a flat surface 16 fittable to the outward flange 11c in intimate contact therewith, and the lower surface thereof is an inwardly curved fragmentary cylindrical surface 17 fittable to the outer surface of the discharge pipe peripheral wall 7a in intimate contact therewith. Each of opposite ends, with respect to the circumferential direction, of the cylindrical surface 17 is slightly separated from the outer surface of the peripheral wall 7a radially outwardly of the pipe 7 as indicated at 18. This portion 18 serves to form a clearance between the cylindrical surface 17 and the outer surface of the peripheral wall 7a for depositing the brazing material therein (see FIG. 3). With the tubular portion 11c of the joint member 11 inserted in the hole 14 formed in the peripheral wall 7a, the resulting assembly is heated to join the brazing ring 15 to the outward flange 11a of the joint member 11 and to the outer surface of the peripheral wall 7a of the discharge pipe 7 by brazing, whereby the pipe joint member 11 is attached to the discharge pipe 7.

The pipe joint member 11 is joined to the heat medium discharge pipe 7 with the brazing ring 15 in this way concurrently when the evaporator 1 is fabricated by assembling the zigzag flat tube 2, corrugated fins 3, inlet header 4, outlet header 5, heat medium feed pipe 6 and heat medium discharge pipe 7. After all the components have been assembled, the assembly is collectively brazed in a vacuum, whereby the outward flange 11a of the joint member 11 is brazed to the outer surface of the peripheral wall 7a of the discharge pipe 7 with the brazing ring 15.

FIGS. 6 to 10 show a tubular body having a pipe joint member as another embodiment of the invention as applied to each header of a condenser for motor vehicle air conditioners.

Figure 6:
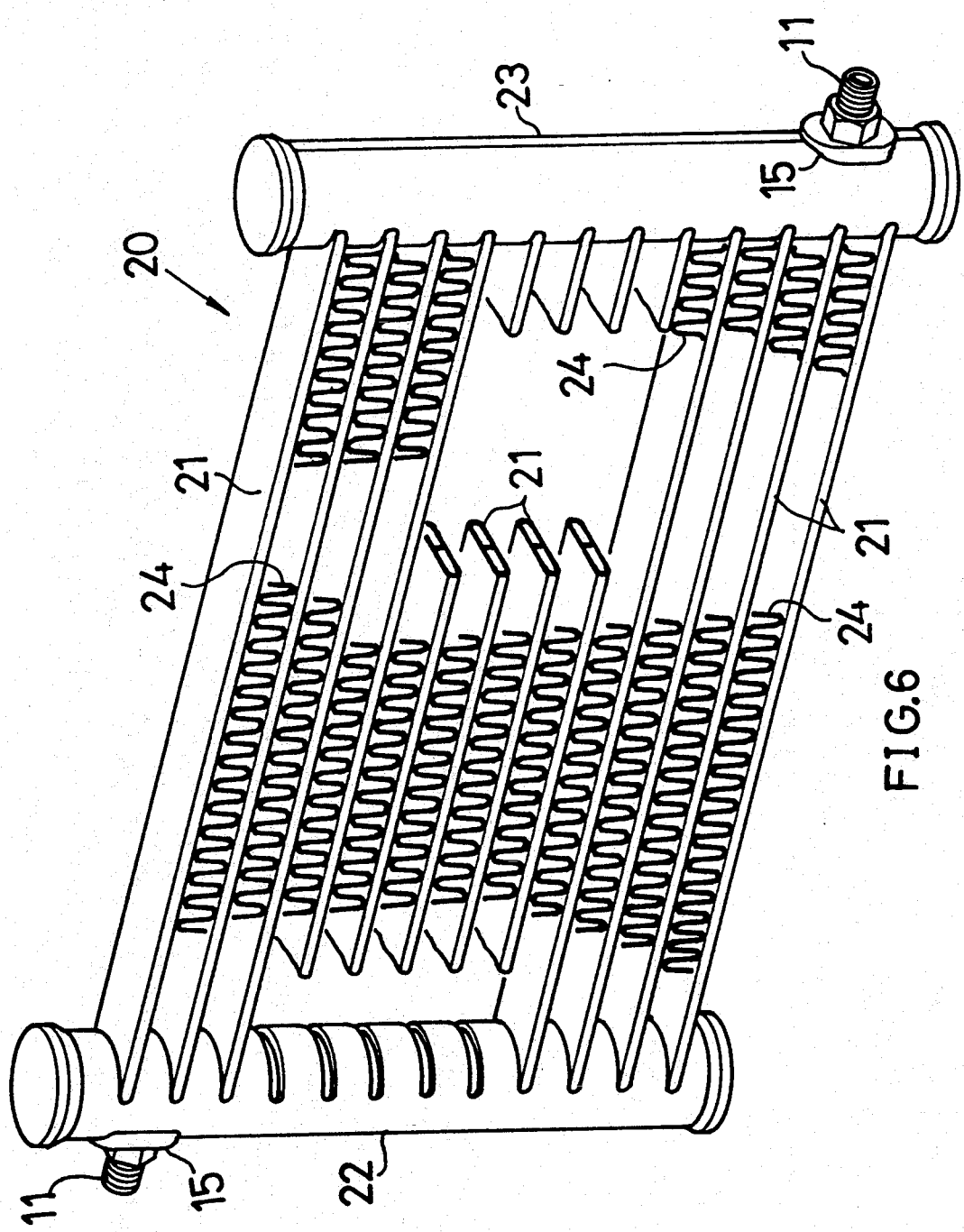
FIGS. 6 to 10 show a tubular body having a pipe joint member as another embodiment of the invention as applied to each header of a condenser for a motor vehicle air conditioner.
Figure 7:
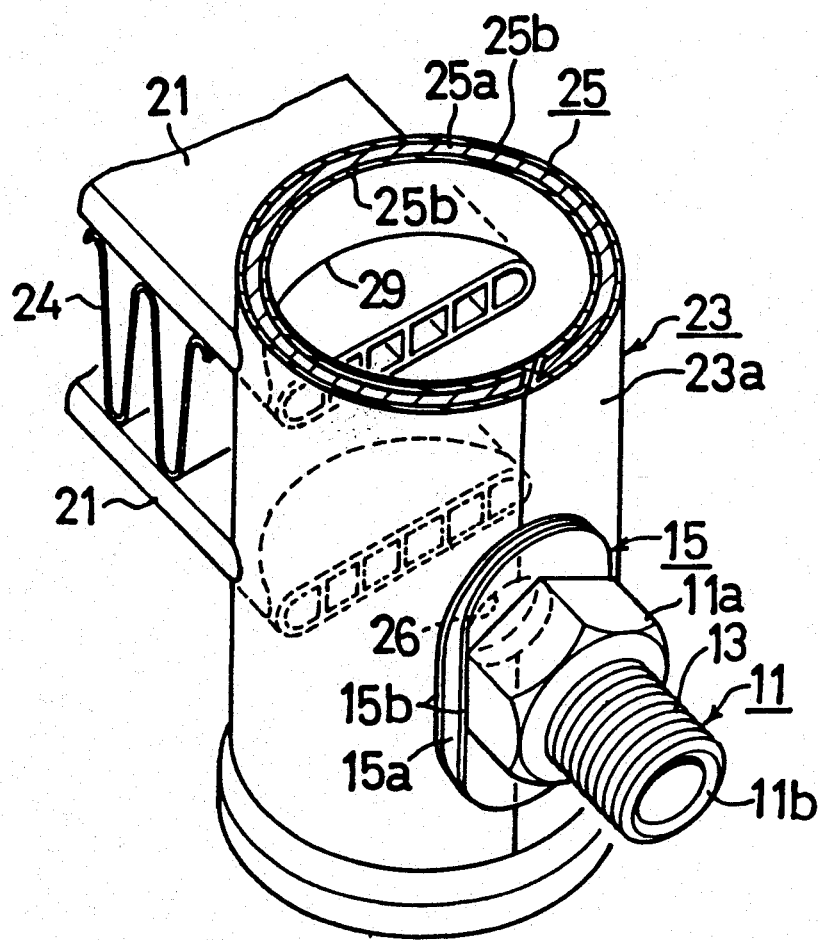

With reference to FIG. 6 showing the condenser 20 in its entirety, the condenser 20 comprises a plurality of flat tubes 21 made, for example, of aluminum, extending horizontally and arranged one above another at a predetermined spacing, an inlet header 22 and an outlet header 23 each in the form of a pipe of circular cross section and having connected thereto the respective ends of the tubes 21, and corrugated fins 24 made, for example, of aluminum and provided between the adjacent flat tubes 21. The same pipe joint member 11 as in the first embodiment is attached to each of the inlet header 22 and the outlet header 23. A heat medium feed pipe (not shown) is connected to the inlet header 22 with the joint member 11 thereon. A heat medium discharge pipe (not shown) is connected to the outlet header 23 with the joint member 11 thereon. The inlet header 22 and the outlet header 23 have the same construction, so that the outlet header 23 will be described. With reference to FIG. 7, the outlet header 23 is prepared from a plate 25 which is, for example, an aluminum brazing sheet comprising a core 25a and a cladding of brazing material 25b formed over each of opposite surfaces of the core, by forming the plate 25 into a tube of circular cross section by press work, with opposite side edges butting against each other, and joining the butting edges together. A hole 26 is formed in the header 23 across the butt joint. In the same manner as in the first embodiment, the pipe joint member 11 is brazed to the outer surface of the peripheral wall 23a of the outlet header 23 with a brazing ring 15.

Figure 8:
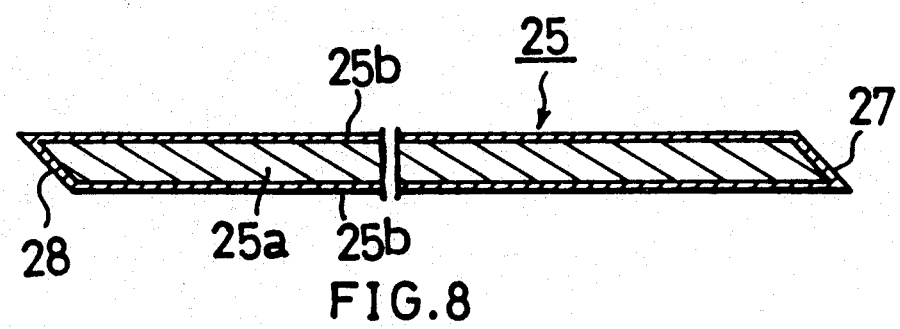
Figure 9:
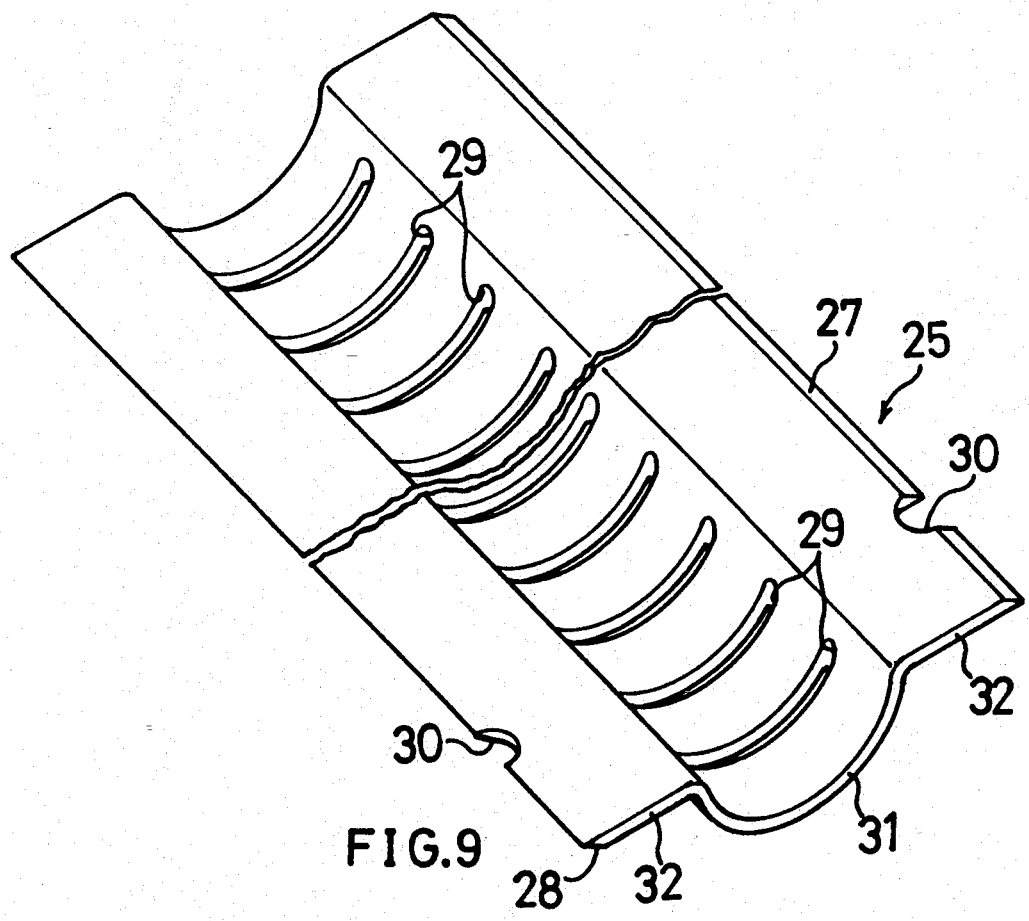
Figure 10:
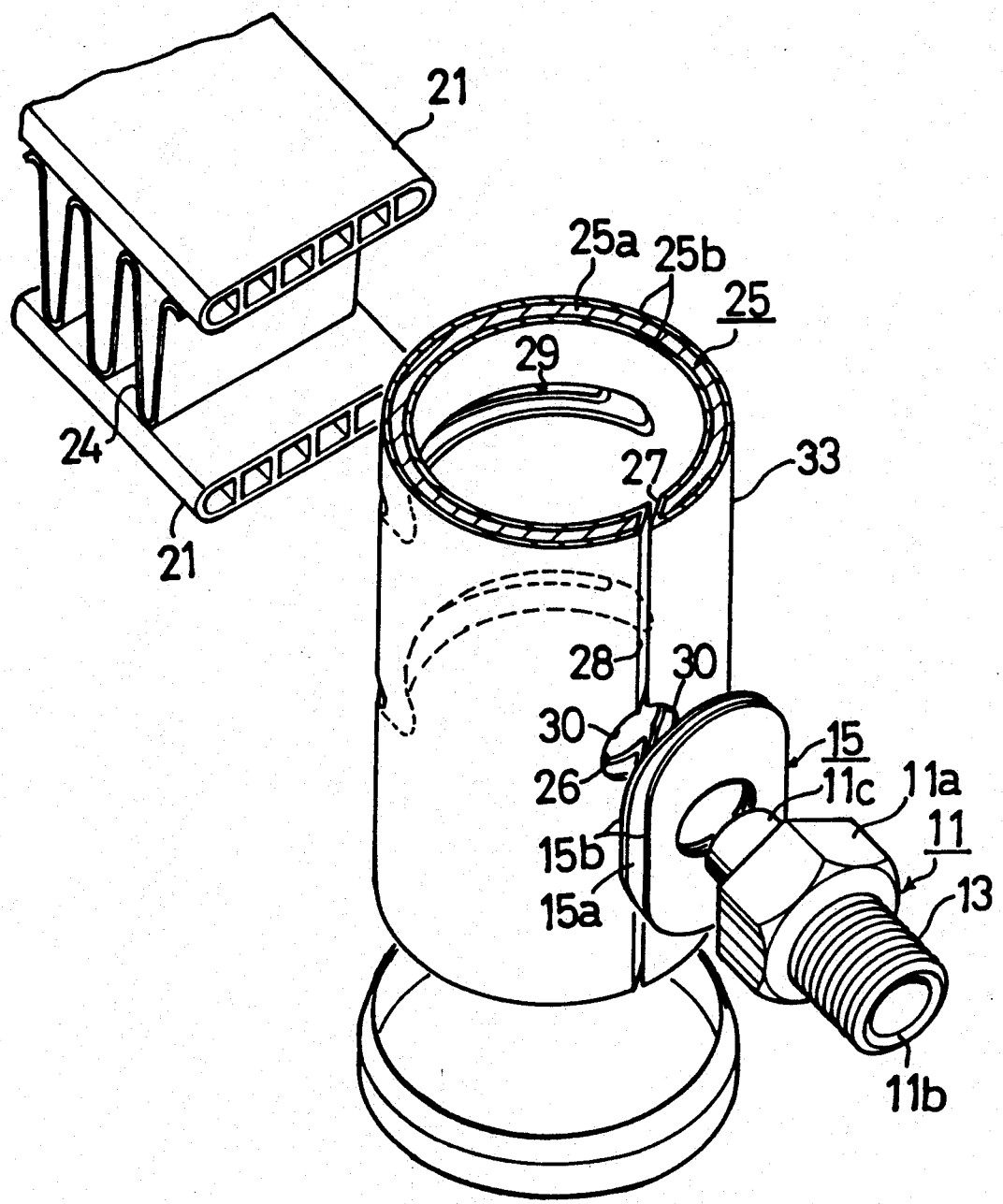

The method of producing the outlet header 23 will be described in greater detail with reference to FIGS. 8 to 10. The outlet header 23 is produced concurrently with assembling of the flat tubes 21 and the corrugated fins 24 and simultaneously with the production of the inlet header 22 for the fabrication of the condenser 20. First, a plate 25 is prepared which is made of an aluminum brazing sheet comprising a core 25a and a brazing material layer 25b covering each of opposite surfaces of the core 25a, and semicircular cutouts 30 are formed in the respective opposite side edges of the plate at the same position with respect to the lengthwise direction of the plate. Next, the side edges of the plate 25 are struck with a hammer or press in the direction of its thickness. One of the side edges is thus hammered or pressed on the upper surface of the plate, and the other side edge on the lower surface, whereby a face 27 slanting downward is formed at the above-mentioned one side edge, and a face 28 slanting upward at the other side edge as seen in FIG. 8. Both the slanting faces 27, 28 are covered with a brazing material layer 25b. The plate 25 thus formed with the slanting faces 27, 28 is then subjected to press work to form a semicylindrical portion 31, horizontal portions 32 along the respective side edges thereof, and a plurality of slits 29 in the bottom of the semicylindrical portion 31 for inserting the respective flat tubes 21 therein, the slits 29 extending widthwise of the plate 25 and arranged at a predetermined spacing longitudinally of the plate (see FIG. 9). The entire plate 25 is then subjected to press work again and thereby formed into a tubelike shape having a circular cross section as seen in FIG. 10, with a small clearance provided between the opposed side edge slanting faces 27 and 28 as shown in FIG. 10. The length of the slits 29 is slightly smaller than the width of the flat tubes 21. The flat tubes 21 are forced each at its one end into the slits 29. With the tube ends forced into the slits 29, the opposed side edge slanting faces 27, 28 are brought into intimate contact with each other, and the cutouts 30 provide a hole 26. In this way, a tubelike body 33 is formed which has a circular cross section and an outer peripheral surface of the same curvature as the inwardly curved fragmentary cylindrical surface 17 of a brazing ring 15. Corrugated aluminum fins 24 are then arranged between the adjacent flat tubes 21. The tubular portion 11c of a pipe joint member 11 having the brazing ring 15 fitted therearound is further inserted into the hole 26, with the flat surface 16 of the ring 15 brought into intimate contact with the outward flange 11a of the joint member 11 and with the cylindrical surface 17 into intimate contact with the outer surface of the tubelike body 33. The assembly is then entirely brazed in a vacuum. Consequently, the slanting faces 27, 28 of the tubelike body 33 are brazed to each other to give an outlet header 23, and the brazing ring 15 is joined to the outward flange 11a of the joint member 11 and to the outer surface of the outlet header 23 by brazing, whereby the joint member 11 is attached to the outlet header 23.

What is claimed is:

1. A structure for connection to a tubular body having an internal fluid passage and having a curved, circular-arc cross section peripheral wall with a cylindrical exterior surface and having a hole extending radially therethrough from said exterior surface to said passage, comprising:
    a pipe joint member for fluid communication with the interior of said tubular body, having an internal passage extending from a first end configured for insertion into said hole in said tubular body to a second end configured for connection to a fluid pipe, and an outwardly extending flange between said first and second ends having an essentially planer surface facing said first end, and
    separable brazing ring for positioning around said first end of said pipe joint member adjacent said flange, having a first surface for contact with said exterior surface of said peripheral wall of said tubular body when said first end is inserted into said hole of said tubular body;
    braze cladding means on said first and second surfaces of said brazing ring for connecting said pipe joint member to said tubular body by brazing such that said first ring surface is brazed to said flange and said second ring surface is brazed to said exterior surface of said tubular body.

2. A structure for connecting to a tubular body as defined in claim 1, wherein
    the cladding of brazing material on the second surface of the brazing ring further incorporation at opposite ends thereof relative to a circumferential direction of the second surface, outwardly extending portions which are formed so as to contact with the outer surface of the curved wall portions of the tubular body thereby forming a brazing material deposition clearance between the second surface of the brazing ring and the outer surface of the curved wall portion.

3. A structure for connection to a tubular body as defined in claim 1 wherein said tubular body is a pipe having a circular cross section.

4. A structure for connection to a tubular body as defined in claim 1 wherein said tubular body is prepared by forming a plate into a tube of circular cross section with opposite side edges butting against each other and joining the edges together with a brazing material, wherein the hole is formed in the side edges of the plate across the butt joint.

5. A structure for connection to a tubular body as defined in claim 1 wherein said outer periphery of the outward flange of said pipe joint member is hexagonal in cross section.

6. A method for producing a tubular body having a pipe joint member attached thereto, comprising the steps of:
    providing a tubular body having a peripheral wall including a curved wall portion with a circular-arc cross section and a hole through said curved wall portion of said peripheral wall;
    forming a pipe joint member with an outward flange at an intermediate portion along a length of the pipe joint member and upper and lower tubular portions positioned beyond the outward flange toward opposite ends of the pipe joint member;
    fabricating a brazing ring with a cladding of brazing material over each of a first and second opposite surfaces, said first surface formed to fit against said flange and said second surface formed as a concave surface fittable to the outer surface of said curved wall portion of said tubular body;
    fitting the brazing ring around the lower tubular portion of the pipe joint member;
    inserting the lower tubular portion of the pipe joint member into the hole in the tubular body to bring said first surface of said brazing ring into intimate contact with said flange and said second surface of said brazing ring into intimate contact with said outer surface of said curved wall portion of said tubular body;
    heating said tubular body, said pipe joint member and said brazing ring to join said brazing ring to said flange and to said outer surface of said tubular body by brazing.

7. A method of producing a tubular body having a pipe joint member attached thereto as defined in claim 6 said step of providing said tubular body including the steps of:
    fabricating a plate having opposite side edges, at least one side edge being covered with a brazing material, cutting out opposite side edges of the plate at the same position with respect to the lengthwise direction thereof, forming the plate into a tube-like body having a circular cross section and an outer peripheral surface of the same curvature as the second surface of the brazing ring so as to butt the opposite side edges against each other with the brazing material interposed therebetween and to form by the cutouts in the side edges a hole for the outer end of the pipe joint member tubular portion to fit in.

* * * * *